United States Patent
Byrnes et al.

(10) Patent No.: US 6,578,793 B2
(45) Date of Patent: Jun. 17, 2003

(54) METHOD AND APPARATUS FOR FIBER STRAP TERMINATION

(75) Inventors: Francis E. Byrnes, White Plains, NY (US); William P. Fallon, Wallingford, CT (US)

(73) Assignee: Sikorsky Aircraft Corporation, Stanford, CT (US)

(*) Notice: Subject to any disclaimer, the term of this patent is extended or adjusted under 35 U.S.C. 154(b) by 0 days.

(21) Appl. No.: 09/782,338

(22) Filed: Feb. 13, 2001

(65) Prior Publication Data

US 2002/0109042 A1 Aug. 15, 2002

(51) Int. Cl.[7] .............................................. B64C 27/48
(52) U.S. Cl. ......................... 244/6; 244/17.11; 416/87
(58) Field of Search ............................... 242/918, 917; 188/76, 77 W; 244/17.11, 6, 7 R, 7 A, 49, 218; 416/17.23, 87, 88, 89

(56) References Cited

U.S. PATENT DOCUMENTS

| | | | | |
|---|---|---|---|---|
| 4,142,697 A | * | 3/1979 | Fradenburgh | 244/7 R |
| 4,477,036 A | * | 10/1984 | Rundo | 156/184 |
| 4,664,333 A | * | 5/1987 | Inada et al. | 439/383 R |
| 4,716,062 A | * | 12/1987 | Klein | 428/297.4 |
| 5,470,413 A | * | 11/1995 | Cedarleaf | 156/166 |
| 5,620,303 A | * | 4/1997 | Moffitt et al. | 415/119 |
| 5,620,304 A | * | 4/1997 | Matsuka et al. | 416/101 |
| 5,636,969 A | * | 6/1997 | Matsuka et al. | 416/226 |
| 5,642,982 A | * | 7/1997 | Matuska et al. | 416/87 |
| 5,655,879 A | * | 8/1997 | Kiely et al. | 416/226 |
| 5,735,670 A | * | 4/1998 | Moffitt et al. | 244/1 N |
| 5,765,320 A | * | 6/1998 | Hamy | 52/108 |
| 6,019,578 A | * | 2/2000 | Hager et al. | 416/87 |
| 6,030,177 A | * | 2/2000 | Hager | 244/17.23 |

* cited by examiner

Primary Examiner—Peter M Poon
Assistant Examiner—Timothy D. Collins
(74) Attorney, Agent, or Firm—Carlson, Gaskey & Olds

(57) ABSTRACT

A variable diameter rotor blade assembly includes a rotor hub with multiple rotor blades each having an outboard blade section telescopically mounted to an inboard blade section. A reeling assembly includes a strap drum that extends and retracts a strap attached to each of the outboard blade sections to selectively change the diameter of the rotor blade assembly. The strap includes a body portion extending toward the drum and a termination portion attached to each of the outboard blade sections. The termination portion is made from a rigid fiber reinforced composite that has a higher rigidity than the body portion. A transition region is formed between the body portion and the termination portion and is made from a flexible matrix-fiber composite that has a higher rigidity than the body portion and a lower rigidity than the rigid fiber reinforced composite. The body portion is formed from layers of spanwise fibers and the termination portion is formed from alternating layers of spanwise fibers and angled fibers resulting in the termination portion having a greater thickness than the body portion. The orientation of the fibers in addition to the rigid fiber composite material increases the overall strength of the termination portion.

16 Claims, 4 Drawing Sheets

METHOD AND APPARATUS FOR FIBER STRAP TERMINATION

This invention was made with government support under Contract No.: DABT63-99-3-0002 awarded by the Department of the Army. The government therefore has certain rights in this invention.

BACKGROUND OF THE INVENTION

The present invention provides method and apparatus for a fiber strap termination. Specifically, the fiber strap termination area is formed from a rigid fiber reinforced composite, which allows the strap to be securely attached to a structural member.

Fiber straps are typically mounted at one end to a strap drum and at an opposite end to a movable structural member. The strap retracts and extends from the drum to move the structural member to a desired location. In one example, the strap drum is incorporated into a tilt rotor or tilt wing aircraft. This type of aircraft utilizes a pair of rotor systems which are pivotable such that the rotors may assume a vertical or horizontal orientation. In a horizontal orientation (i.e., horizontal rotor plane), the aircraft is capable of hovering flight, while in a vertical orientation (i.e., vertical rotor plane), the aircraft is propelled in the same manner as conventional propeller-driven fixed-wing aircraft. The strap drum is incorporated into a Variable Diameter Rotor (VDR) system. This system is used to change the outer diameter of the rotors depending upon the orientation of the rotor system. Typically, when the plane of the rotor is oriented horizontally, the rotor diameter is enlarged for improved hovering efficiency and, when oriented vertically, the rotor diameter is reduced for improved propulsive efficiency. Usually the strap drum is centrally mounted with respect to the rotor blades and includes one strap for each of the blades. One end of a strap is mounted to a movable portion of the blades while the opposite end is attached to the drum. The strap is extended from the drum to increase the diameter of the blades and is retracted to decrease the diameter of the blades.

In another example, the strap drum is incorporated into an elevator system. The elevator moves between different vertical levels in building to transport passengers and cargo to desired locations within the building. The strap drum is typically fixed relative to the elevator and one end of the strap is mounted to a movable elevator component. The strap extends and retracts from the drum to move the elevator component to a desired location.

One important aspect of the fiber strap is the termination portion. The termination portion is the end portion of the strap that is secured to the movable structural member, such as the rotor blade or the elevator component. Current methods for strap termination have resulted in decreased normal strength of the strap due to premature failures at the termination area. One method terminates the strap by looping the strap over a pin and then stitching the overlapped portions of the strap together. Another method consists of clamping the strap between metal plates that additionally require looping of the strap, and then fastening the strap to the structural member.

Both of these methods have experienced premature failures at the start of termination area. Additionally, because both methods required the strap to be looped, significant assembly time is required and increased packaging space is required for the terminated strap portion to be secured to the structural component.

Accordingly, it is desirable to provide strap termination method and apparatus that is easily assembled, has increased normal strength and is robust, and which can be utilized more effectively in areas with little available packaging space.

SUMMARY OF THE INVENTION

The drive strap that extends and retracts from a strap drum according to the present invention includes a strap member with an extended body portion made from a first material and a termination portion made from a second material having a higher rigidity than the first material.

In the preferred embodiment, the first material is a flat fiber rope and the second material is a rigid fiber-resin composite material. A transition region is preferably formed between the body portion and the termination portion and is made from a third material that has a higher rigidity than the first material and a lower rigidity than the second material. The third material is a flexible matrix-fiber composite.

Also in the preferred embodiment, the body portion is formed from layers of spanwise fibers and the termination portion is formed from alternating layers of spanwise fibers and angled fibers. This results in the termination portion having a greater thickness than the body portion. The orientation of the fibers in addition to the rigid fiber composite material increases the overall strength of the termination portion.

In one embodiment, the drive strap is used in a variable diameter rotor blade assembly that includes a rotor hub with multiple rotor blades each having an outboard blade section telescopically mounted to an inboard blade section. A reeling assembly includes the strap drum that extends and retracts the strap attached to each of the outboard blade sections to selectively change the diameter of the rotor blade assembly. The strap includes a body portion extending toward the drum and a termination portion attached to each of the outboard blade sections. The termination portion is made from a rigid fiber reinforced composite that has a higher rigidity than the body portion.

At least one fastener is used to secure the termination portion to the outer blade section. Preferably, the termination portion is significantly shorter than the body portion but is long enough to support the required number of fasteners.

The method for terminating the fiber strap includes forming the body portion with a first material, forming the termination portion with a second material having a higher rigidity than the first material, and securing the termination portion to a structural member. Additional steps include forming the first material as a plurality of yarn fibers and forming the second material as a rigid fiber composite.

The preferred method includes forming the body portion with spanwise fibers, forming the termination portion with spanwise fibers and angled fibers, and alternating layers of spanwise fibers with angled fibers to form a termination portion thickness that is greater than the body portion thickness. Additional steps include forming a transition region between the body portion and the termination portion with a third material having a higher rigidity than the first material and a lower rigidity than the second material, forming the length of the transition region as being at least as long as the width of the strap, and forming the third material from a flexible fiber composite including urethane.

This unique method and apparatus provides a strap termination with significantly increased strength, and which can be used in tight packaging areas.

BRIEF DESCRIPTION OF THE DRAWINGS

The various features and advantages of this invention will become apparent to those skilled in the art from the following detailed description of the currently preferred embodiment. The drawings that accompany the detailed description can be briefly described as follows.

DETAILED DESCRIPTION OF THE PREFERRED EMBODIMENT

Figure 1A:
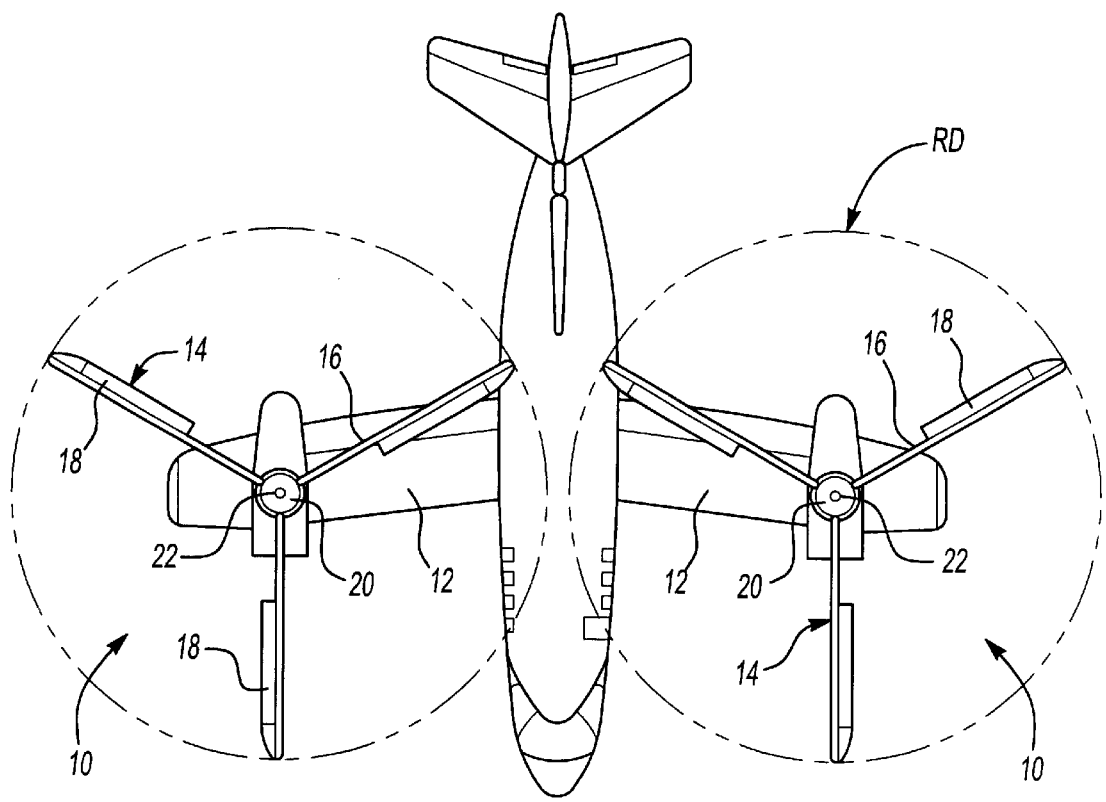
FIG. 1A is a plan view of a tilt-rotor aircraft illustrating a variable diameter rotor system in its horizontal position including the strap of the present invention.
Figure 1B:
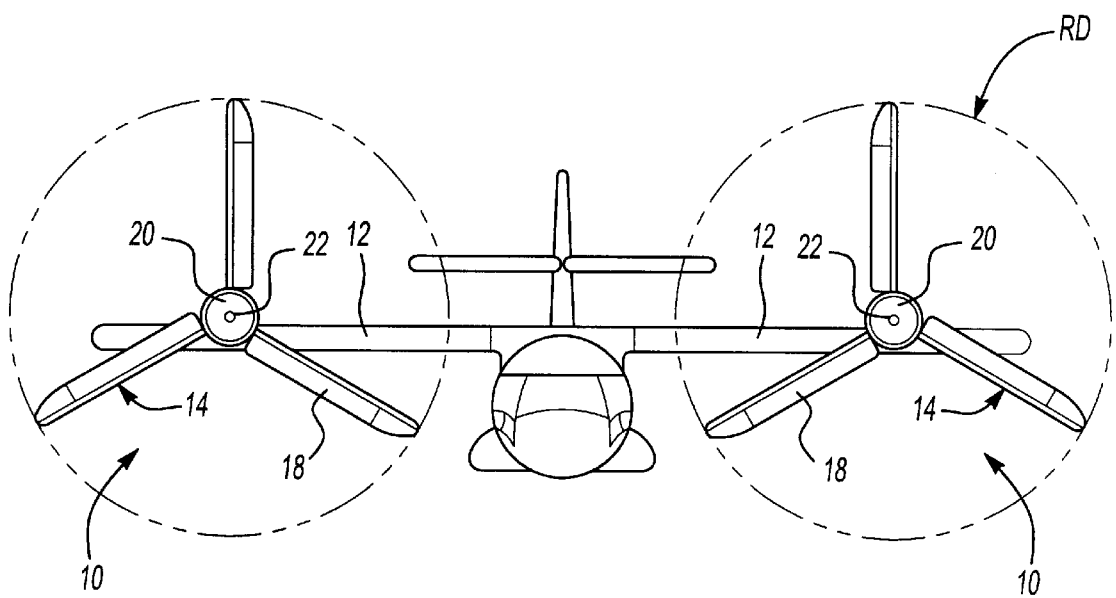
FIG. 1B is a front view of a tilt-rotor aircraft illustrating a variable diameter rotor system in its vertical position including the strap of the present invention.

FIG. 1 schematically illustrates a tilt rotor aircraft that includes a pair of variable diameter rotor blade (VDR) systems 10. The VDR systems 10 are shown pivotally mounted on laterally extending wing sections 12 of an aircraft. The VDR systems 10 are pivotable between a horizontal or hover flight position, shown in FIG. 1A, and a vertical or forward flight position, shown in FIG. 1B.

Each VDR system 10 includes a plurality of variable diameter rotor blade assemblies 14 which are capable of being extended and retracted to vary the size of the rotor diameter (RD) as required. In order to effectuate the change in diameter, the VDR blade assemblies 14 include an inboard rotor blade section 16 and an outboard rotor blade section 18 which telescopes relative to the inboard rotor blade section 16. The VDR blade assembly 14 is mounted to and driven by a rotor hub assembly 20 about an axis of rotation 22.

Figure 2:
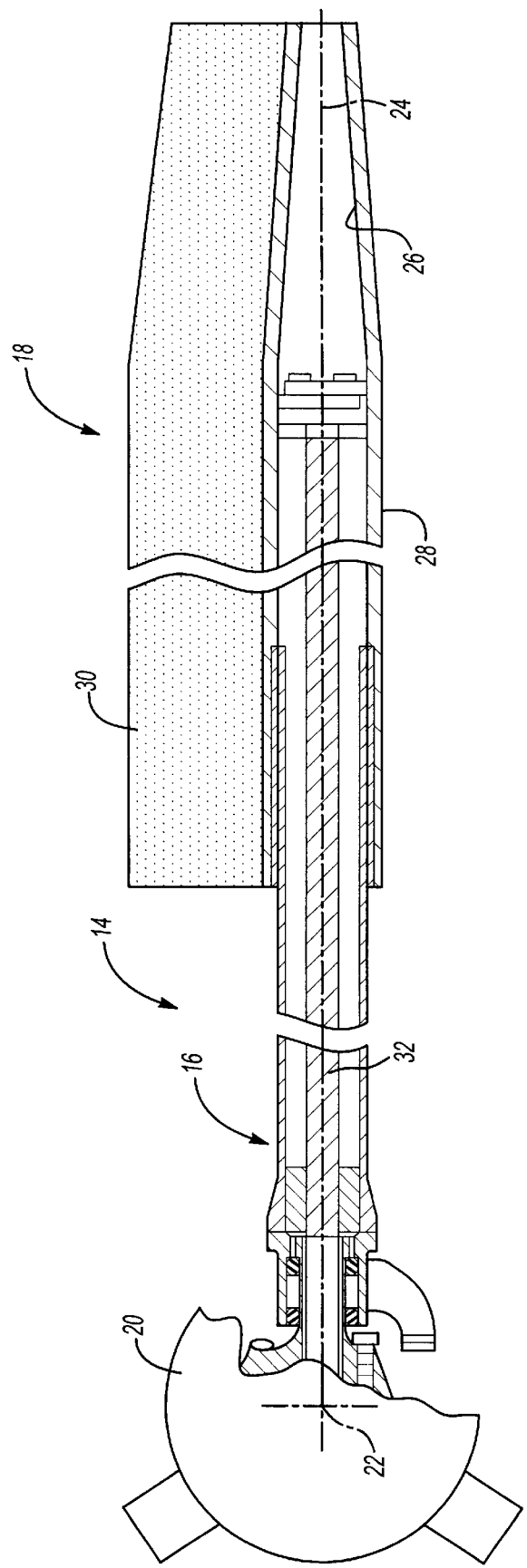
FIG. 2 is cross-sectional view, partially cut away, of a variable diameter rotor blade assembly.

Referring to FIG. 2, each VDR blade assembly 14 includes the movable outboard rotor blade section 18 which telescopes over the inboard rotor blade section 16 (hereinafter referred to as a torque tube) along a longitudinal axis 24. The outboard rotor blade section 18 includes a hollow spar member 26 which is enveloped by a leading edge 28 and a trailing edge 30 to define the requisite aerodynamic contour of the outboard rotor blade section 18. The spar member 26 and thus the outboard rotor blade section 18 are thereby telescopically retractable and extendable relative to the torque tube 16 by a drive strap 32 attached to the outboard rotor blade section 18. Preferably, the drive strap 32 includes multi-fiber material construction to provide redundant load paths for ballistic survivability.

A VDR retraction/extension system collectively controls each VDR blade assembly 14 of the variable diameter rotor system 10. Insofar as each VDR blade assembly 14 is essentially identical, it should be understood that the following description of the exemplary VDR blade assembly 14 and the interacting components of the retraction/extension system are applicable to all blade assemblies 14 of the VDR system.

Figure 3:
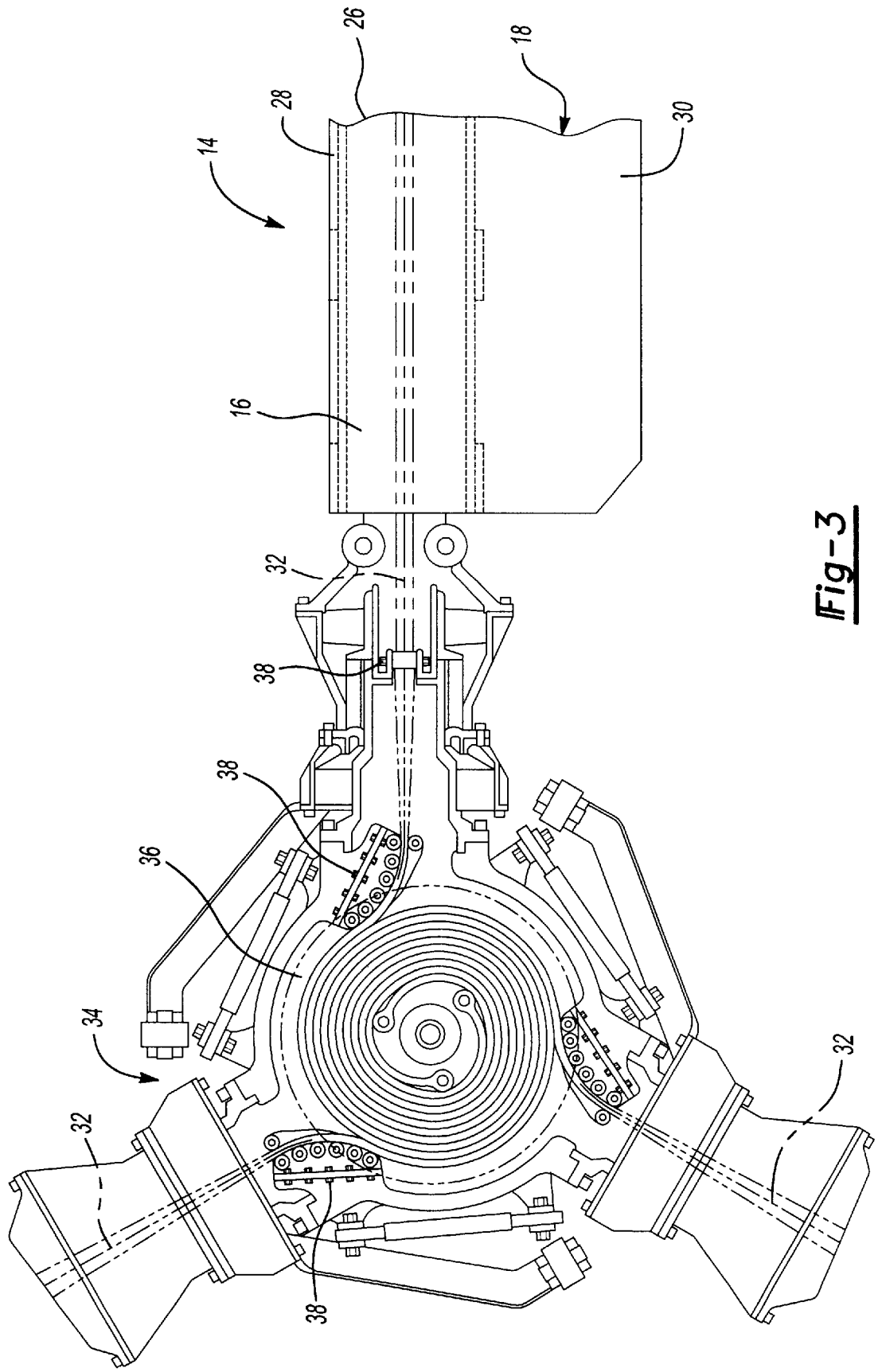
FIG. 3 is a top view of the variable diameter rotor drive system illustrating a reeling assembly with a strap drum.

The retraction/extension system according to the present invention includes a reeling system 34, shown in FIG. 3 driven by a gear system. The reeling system 34 includes a strap drum 36 rotatable about rotational axis 22.

The reeling system 36 extends and retracts the drive strap 32, which is wound about or wound off of the strap drum 36. The strap 32 is disposed in winding combination with the strap drum 36 and extends between a multiple of guide pulleys 38, or other suitable guides, for centering the strap 32 in substantial alignment with the longitudinal axis 24 of the rotor blade assembly 14. The strap 32 extends through the torque tube 16 and is affixed at its outboard end to the spar member 26 (FIG. 2).

Figure 4:
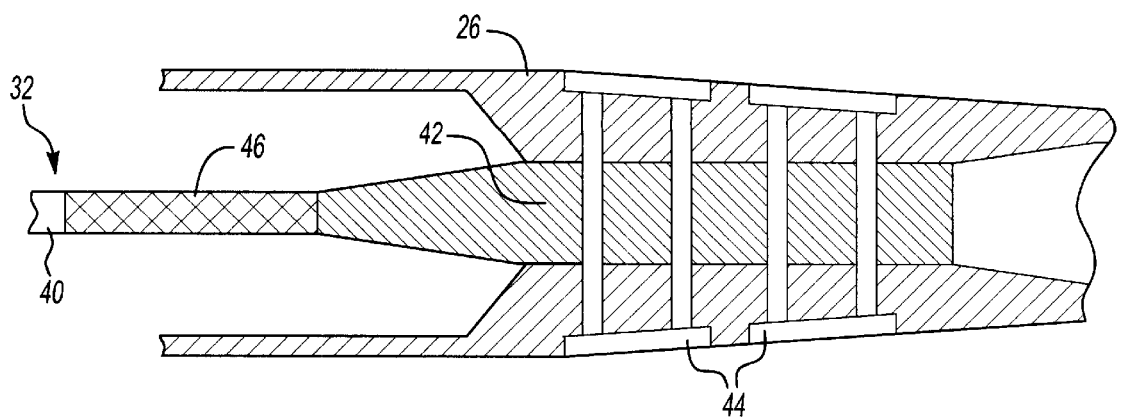
FIG. 4 is a cross-sectional view of the strap.

As shown in FIG. 4, the drive strap 32 has an extended body portion 40 and a termination portion 42. The body portion 40 extends back towards the drum 36 and is made from a first material, such as a flat fiber rope made from a plurality of yarn fibers as is known in the art. The termination portion 42 is made from a rigid fiber reinforced composite with a higher rigidity property than the body portion 40. Preferably, the rigid fiber reinforced composite includes a resin such as epoxy, or another similar material.

The termination portion 42 is attached to a movable structural member such as the spar 26 by any of various known attachment methods. For example, a plurality of fasteners, such as bolts 44 can be used to attach the termination portion 42 to the spar 26. The termination portion 42 is significantly shorter than the body portion 40 but is long enough to support the required number of fasteners 44.

In the preferred embodiment, a transition region 46 is formed between the body portion 40 and the termination portion 42. This transition region 46 is made from a flexible matrix fiber composite and has a higher rigidity than the body portion 40 and a lower rigidity than termination portion 42. Preferably, the flexible matrix-fiber composite material is urethane, or another similar material.

Figure 5:
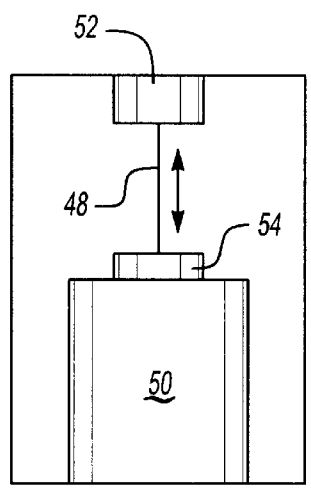
FIG. 5 is a schematic view of the subject invention as used in an elevator assembly.

It should be understood that while the subject drive strap 32 and drum assembly 36 have been described as being utilized in a VDR system 10, the subject strap 32 could be used in other similar applications. For example, a drive strap 48 could be utilized in an elevator system 50 shown in FIG. 5. A strap drum or other similar strap support structure 52 is fixed relative to a moving elevator component 54. The strap 48 extends and retracts from the drum 52 to move the component 54 to a desired location. The strap includes a body portion 40, termination portion 42, and a transition region 46 similar to those discussed above.

The method for terminating a fiber strap 32 includes the following steps. A body portion 40 is formed from a first material, a termination portion is formed from a second material with a higher rigidity than the first material, and the termination portion 42 is secured to a structural member such as a spar 26 or elevator component 54. The first material is formed from a plurality of yarn fibers while the second material is formed from a rigid fiber composite.

A transition region 46 is formed between the body portion 40 and the termination portion 42 from a third material having a higher rigidity than the first material and a lower rigidity than the second material. The third material is formed from a flexible fiber composite. The transition region should be at least the length of one times the width of the strap 32 and preferably the length would be up to three times the width of the strap 32. The length of the termination portion 42 typically depends upon the number of fasteners 44. The termination portion 42 preferably has an edge distance of two (2). For example, if the fastener 44 is a one (1) inch bolt then the distance from the centerline of the bolt 44 to each edge of the strap 32 should be at least two (2) inches. This provides the highest strength with the minimum cross-section.

Figure 6:
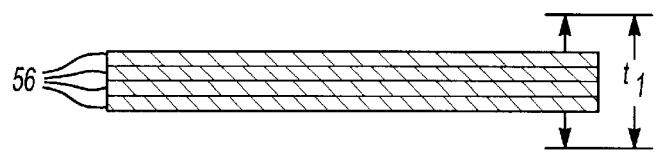
FIG. 6 is a cross-sectional view of a transition portion of the strap.
Figure 7:
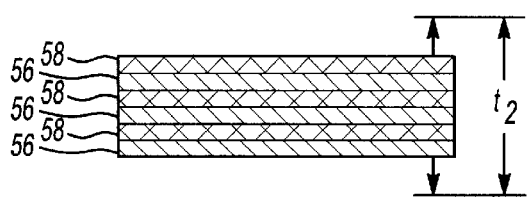
FIG. 7 is a cross-sectional view of one embodiment of the termination portion of the strap.
Figure 8:
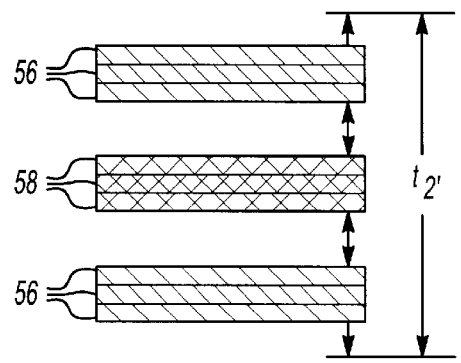
FIG. 8 is a cross-sectional view of an alternate embodiment of the termination portion of the strap.

Preferably, the body portion 40 and the transition region 46 are formed with layers of spanwise fibers 56, as shown in FIG. 6 while the termination portion 42 is formed from layers of spanwise fibers 56 and layers of angled fibers 58, as shown in FIGS. 7 and 8. The spanwise fibers 56 can be alternated with layers of angled fibers 58 as shown in FIG. 7 or the angled fibers 58 can be sandwiched between layers of spanwise fibers as shown in FIG. 8.

As discussed above, the flat fiber rope body portion 40 is made from a plurality of yarn fibers. Typically, each yarn fiber is 0.0005 inches thick and approximately 400 yarns are used. The goal is to try to load the yarns uniformly to avoid premature failure. The introduction of the urethane flexible fiber composite transition region 46 and the rigid fiber composite termination portion 42 helps equalize the load over the yarn. Resin is incorporated into the strap 32 at the termination portion 42 and is cured to create a laminate type rigid composite matrix joint. The additional angled fiber layers 58 increase the thickness $t_2$ or $t_{2'}$ of the termination portion 42 as compared to the body portion and transition region 46 thickness $t_1$. Preferably, the termination portion 42 has 50% spanwise fibers and 50% angled fibers, however, other percentages could also be used. The angled fibers are preferably +/−45 degrees and are alternated between the spanwise fibers. The 45 degree fibers allow the fasteners 44 to pull against the fibers rather then pulling against the resin alone.

The angled fibers 58 are introduced before introducing the matrix in the termination portion 42 by a resin transfer matrix (RTM) process. In this process the fibers are impregnated with resin and heated. The process has a specified cure cycle with a specific temperature profile over a predetermined length of time. The cure cycle varies depending upon the requirements for the termination portion 42. The resulting cured laminate region is easily incorporated into a bolted joint type termination where no strength degradation of the normal strap strength will result provided the transition region is also incorporated into the strap. The transition region allows for a gradual transition for the primary load carrying yarn to transform from pure yarn fiber at the body portion 40 to a flexible matrix at the transition region 46 to a rigid epoxy resin area at the termination portion 42. This unique termination method and apparatus provides a strap termination with significantly increased strength that is easily installed, and which can be used in tight packaging areas.

The foregoing description is exemplary rather than defined by the limitations within. Many modifications and variations of the present invention are possible in light of the above teachings. The preferred embodiments of this invention have been disclosed, however, one of ordinary skill in the art would recognize that certain modifications would come within the scope of this invention. It is, therefore, to be understood that within the scope of the appended claims, the invention may be practiced otherwise than as specifically described. For that reason the following claims should be studied to determine the true scope and content of this invention.

What is claimed is:

1. A drive strap for windingly extending and retracting from a strap drum comprising:
   a strap member having an extended body portion made from a first material, a termination portion made from a second material having a higher rigidity than said first material, transition region between said body portion and said termination portion comprised of a third material having a higher rigidity than said first material and a lower rigidity than said second material wherein said first material is a flat fiber rope and said second material is a rigid fiber-resin composite material.

2. The strap as recited in claim 1 wherein said third material is a flexible matrix-fiber composite material.

3. The strap as recited in claim 2 wherein said rigid fiber-resin composite material includes epoxy.

4. The strap as recited in claim 3 wherein said flexible matrix-fiber composite includes urethane.

5. A method for terminating a fiber strap comprising the steps of:
   (a) providing a strap having a body portion and a termination portion;
   (b) forming the body portion with a first material comprising a plurality of fibers;
   (c) forming the termination portion with a second material having a higher rigidity than the first material with the second material comprising a rigid fiber composite;
   (d) forming the body portion with spanwise fibers and forming the termination portion with spanwise fibers and angled fibers; and
   (e) securing the termination portion to a structural member.

6. The method as recited in claim 5 including alternating layers of spanwise fibers with angled fibers to form a termination portion thickness that is greater than the body portion thickness.

7. A method for terminating a fiber strap comprising the steps of:
   (a) providing a strap having a body portion and a termination portion;
   (b) forming the body portion with a first material;
   (c) forming the termination portion with a second material having a higher rigidity than the first material;
   (d) forming a transition region between the body portion and the termination portion with a third material having a higher rigidity than the first material and a lower rigidity than the second material; and
   (e) securing the termination portion to a structural member.

8. The method as recited in claim 7 including forming the third material from a flexible fiber composite including urethane.

9. The method as recited in claim 7 including the step of forming the length of the transition region as being at least as long as the width of the strap.

10. A variable diameter rotor blade assembly comprising:
    a rotor hub having multiple rotor blades each having an outboard blade section telescopically mounted to an inboard blade section; and
    a reeling assembly including a strap drum for extending and retracting a strap attached to each of said outboard blade sections to selectively change the diameter of the rotor blade assembly wherein said strap includes a body portion extending toward said drum, a termination portion attached to each of said outboard blade sections, and a transition region formed between said body portion and said termination portion, said body portion being made from a first material and said termination portion being made from a second material having a higher rigidity than said first material and said transition portion being formed from a third material having a higher rigidity than said first material and a lower rigidity than said second material.

11. An assembly as recited in claim 10 including at least one fastener for securing said termination portion to said outer blade section.

12. A variable diameter rotor blade assembly comprising:

a rotor hub having multiple rotor blades each having an outboard blade section telescopically mounted to an inboard blade section; and a reeling assembly including a strap drum for extending and retracting a strap attached to each of said outboard blade sections to selectively change the diameter of the rotor blade assembly wherein said strap includes a body portion extending toward said drum and a distal termination portion attached to each of said outboard blade sections with said body and termination portions being contiguously formed together as a single piece, said body portion being made from a first material and said termination portion being made from a second material having a higher rigidity than said first material wherein said termination portion is significantly shorter than said body portion and wherein said body portion is formed from layers of spanwise fibers and said termination portion is formed from alternating layers of spanwise fibers and angled fibers such that said termination portion has a greater thickness than said body portion.

13. A drive strap for windingly extending and retracting from a strap drum comprising:

a strap member having a body portion made from a first material and extending to a distal termination portion made from a second material having a higher rigidity than said first material wherein said body portion and said termination portions are contiguously formed together as a single piece; and a transition region extending between said body portion and said termination portion comprised of a third material having a higher rigidity than said first material and a lower rigidity than said second material.

14. A drive strap for windingly extending and retracting from a strap drum comprising:

a strap member having a body portion made from a first material and extending to a distal termination portion made from a second material having a higher rigidity than said first material wherein said body portion and said termination portions are contiguously formed together as a single piece wherein said body portion is formed from spanwise fibers and said termination portion is formed from spanwise fibers and angled fibers.

15. A method for terminating a fiber strap comprising the steps of:

(a) providing a strap having a body portion extending to a distal termination portion;

(b) forming the body portion with a first material;

(c) forming the termination portion with a second material having a higher rigidity than the first material with the body and termination portions being contiguously formed together as a single piece, forming the body portion with a first pattern of fibers and forming the termination portion with a second pattern of fibers different than the first pattern, and forming the termination portion with a greater overall thickness than the overall thickness of the body portion; and (d) securing the termination portion to a structural member.

16. A variable diameter rotor blade assembly comprising:

a rotor hub having multiple rotor blades each having an outboard blade section telescopically mounted to an inboard blade section; and a reeling assembly including a strap drum for extending and retracting a strap attached to each of said outboard blade sections to selectively change the diameter of the rotor blade assembly wherein said strap includes a body portion extending toward said drum and a distal termination portion attached to each of said outboard blade sections with said body and termination portions being contiguously formed together as a single piece wherein said termination portion has a greater overall thickness than said body portion, said body portion being made from a first material and said termination portion being made from a second material having a higher rigidity than said first material wherein said body potion is defined by a first pattern of fibers and said termination portion is defined by a second pattern of fibers different than said first pattern.

* * * * *

UNITED STATES PATENT AND TRADEMARK OFFICE
CERTIFICATE OF CORRECTION

PATENT NO. : 6,578,793 B2
DATED : June 17, 2003
INVENTOR(S) : Byrnes et al.

It is certified that error appears in the above-identified patent and that said Letters Patent is hereby corrected as shown below:

<u>Column 5,</u>
Line 65, after "material," insert -- and a --.

<u>Column 6,</u>
Line 15, after "of" insert -- yarn --.

Signed and Sealed this

Seventh Day of October, 2003

JAMES E. ROGAN
*Director of the United States Patent and Trademark Office*